(No Model.)
H. A. MINER.
ELECTRIC RAILWAY CONDUCTOR.
No. 490,297. Patented Jan. 24, 1893.
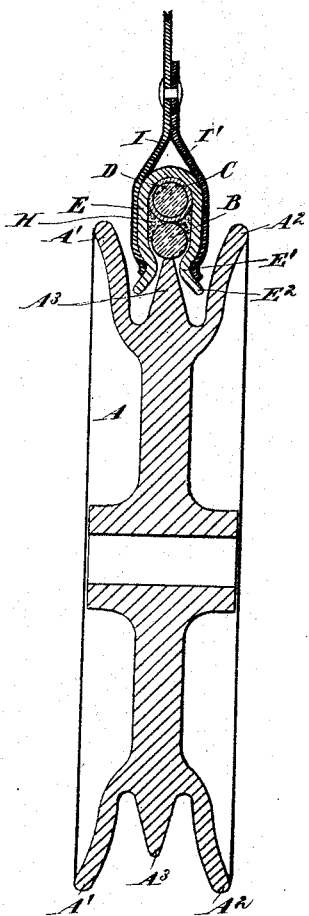
Witnesses:
M. F. Boyle
Charles R. Searle
Inventor:
Howard A. Miner
by his attorney
Thomas Drew Stetson

UNITED STATES PATENT OFFICE.

HOWARD A. MINER, OF NEW YORK, N. Y.

ELECTRIC-RAILWAY CONDUCTOR.

SPECIFICATION forming part of Letters Patent No. 490,297, dated January 24, 1893.

Application filed June 2, 1892. Serial No. 435,256. (No model.)

*To all whom it may concern:*

Be it known that I, HOWARD A. MINER, of the city and county of New York, in the State of New York, have invented a certain new and useful Improvement in Trolley-Railway Appliances, of which the following is a specification.

The invention relates to the suspended wire and the associated parts, and to the trolley wheel which runs thereunder and forms the electric connection. I provide a feeder wire strung immediately above and in close union with the conductor wire, and serving by the aid of a partial inclosing casing, as a mechanical support and guide, and also as a feeder for the conducting wire. The casing is partly or entirely of non-conducting material, and completely covers both wires except a narrow space directly under the conducting wire. The edges of the casing are lips or longitudinal flanges which extend downward and are flared apart. The trolley wheel is formed with divergent flanges to aid in guiding it into place at the commencement, or whenever for any reason it shall after having been depressed be allowed to rise into contact with the conductor. The electrical contact with the conductor wire is formed by a central rib on the trolley wheel.

The accompanying drawing forms a part of this specification, and is a central vertical section through the trolley wheel, the conductor wire, the associated wire and the protecting casing. It also shows a packing of non-conducting material which fills a great portion of the loose space between the wires and the casing.

Referring to the drawing, and to the letters of reference thereon, A is the trolley wheel, certain portions being designated, when necessary, by super-numerals, as A'. This wheel is of brass or other good conductor, and may be mounted in the ordinary manner so that it is free to revolve on a pivot set in a trolley pole, not shown. The pivot is pressed upward by a gentle force, carrying the trolley wheel with it, and the latter revolves freely as the car is traversed along the track, not shown, by means of mechanism operated by the electric current in any ordinary or suitable way.

B is the conductor wire.

D is a feeder wire, shown as exactly equal in size to the conductor wire, but the proportions may be varied.

C is a coating of varnish, rubber, gutta percha, or other good insulating material, covering the feeder wire except at a few points not shown, where it is desired that the current shall freely communicate between the two.

E is a casing of hard rubber or other good non-conductor, formed as shown, and sprung over or otherwise applied upon both the wires B and D. The lower side of this casing is open, the material being deflected inward nearly but not quite together along the line immediately under the wire B, as indicated by E'. Below this the edges of the casing are formed into lips extended downward and flared or inclined apart, as shown by $E^2$. The periphery of the trolley wheel A, is formed with two flaring flanges, A', $A^2$, and with a central rib mid-way between them, the latter being indicated by $A^3$. This rib is adapted to extend through the contracted portion, E', of the casing, and touch the lower face of the conductor wire B, so as to form an electrical connection therewith. The flaring flanges A', $A^2$, guide the wheel into proper contact with the lower wire B, whenever it is allowed to rise into position. If the wheel shall be allowed to rise in a false position, the inner faces of these flanges receive the lips $E^2$, $E^2$, of the casing, and the wheel is guided thereby to the right or left into the required position. The central rib, $A^3$, also contributes to the same result. If this rib is either to the right or left of its correct position, it will be guided by the lips $E^2$, and the contracted portions E', of the casing E, and thus led into the correct position to form a contact with the wire B. After the wheel A, with its inclined flanges and central rib has risen and engaged properly with the wires and with the casing, it will run for any period without difficulty.

H, is a packing of asbestus, or other suitable material, filling a large portion of the space not otherwise occupied within the casing E.

The electrical contact between the feeder and the conductor wire may be made by simply removing the insulating coating C, at the required points on the feeder, and inserting therein a sufficient amount of copper wire to insure contact with the closely lying conductor wire B.

My wires are hung from the ordinary cross suspending wires by clamps I, I', which may be preferably of metal or hard rubber or other non-conducting material. They serve to prevent my wires and inclosing casing from twisting.

It will be observed that the casing E, incloses the conductor wire and its companion and also that the lips $E^2$, extend down so far that the contracted space E', between them through which the central rib $A^3$, of the trolley-wheel plays is defended against any electric contact with the conductor wire by any ordinary handling.

Modifications may be made without departing from the principle or sacrificing the advantages of the invention. I can make the feeder wire D larger or smaller than the conductor wire B. I can change the material of the casing.

Parts may be used without the whole. I can use my casing and inclosed conductor wire B, and trolley-wheel without the feeder wire D.

I claim as my invention:—

1. In a trolley railway system, the feeder wire D, suspended in contact with the conductor wire B, and arranged to serve both as a mechanical support and an electrical feeder for the latter, in combination therewith, and with a case E partially inclosing both wires, as herein specified.

2. In a trolley railway system, the conductor wire B, and feeder wire D, in combination with each other, and with the partial insulating coating C, and with the casing E, having flanges or lips $E^2$ at its lower edges, and partially inclosing both wires, as herein specified.

3. In a trolley railway system, the conductor wire B, and feeder wire D, the insulating coating C, both wires being partially inclosed in the casing E, flanged or lipped at its lower edges, in combination with each other, and with the trolley wheel A, having flared flanges A', $A^2$, and a central rib $A^3$, arranged for joint operation substantially as herein specified.

In testimony that I claim the invention above set forth I affix my signature in presence of two witnesses.

H. A. MINER.

Witnesses:
CHARLES R. SEARLE,
M. F. BOYLE.